United States Patent
Kim et al.

(10) Patent No.: US 7,369,366 B2
(45) Date of Patent: May 6, 2008

(54) SUSPENSION ASSEMBLY OF ACTUATOR FOR DISK DRIVE WITH PORTION OF LOAD BEAM INCLINED LENGTHWISE BETWEEN LIMITER AND LEADING END

(75) Inventors: Do-wan Kim, Suwon-si (KR); Ki-tag Jeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 413 days.

(21) Appl. No.: 10/910,349

(22) Filed: Aug. 4, 2004

(65) Prior Publication Data

US 2005/0047021 A1    Mar. 3, 2005

(30) Foreign Application Priority Data

Aug. 25, 2003    (KR) .................. 10-2003-0058779

(51) Int. Cl.
*G11B 5/48*    (2006.01)
*G11B 21/16*    (2006.01)

(52) U.S. Cl. .................................. 360/245.7
(58) Field of Classification Search .............. 360/245.7
See application file for complete search history.

(56) References Cited

U.S. PATENT DOCUMENTS

| | | | |
|---|---|---|---|
| 4,734,805 A | 3/1988 | Yamada et al. | 360/244.8 |
| 5,815,349 A | 9/1998 | Frater | 360/245.7 |
| 6,046,883 A | 4/2000 | Miller | 360/245.7 |
| 6,222,704 B1 | 4/2001 | Aoyagi et al. | 360/244.9 |
| 6,243,235 B1* | 6/2001 | Fu et al. | 360/245.7 |
| 6,362,936 B2* | 3/2002 | Inoue et al. | 360/244.2 |
| 6,462,911 B1* | 10/2002 | Tokuyama et al. | 360/245.7 |
| 6,483,670 B1 | 11/2002 | Watanabe | 360/245.7 |
| 6,538,850 B1* | 3/2003 | Hadian et al. | 360/245.7 |
| 2002/0027747 A1* | 3/2002 | Budde | 360/245.7 |
| 2002/0075602 A1* | 6/2002 | Mangold et al. | 360/245.7 |

FOREIGN PATENT DOCUMENTS

| | | |
|---|---|---|
| JP | 2000-076810 | 3/2000 |
| JP | 2000-195209 | 7/2000 |
| JP | 2003-141838 | 5/2003 |
| WO | 99/41740 | 8/1999 |
| WO | 01/41135 | 6/2001 |

OTHER PUBLICATIONS

Japanese Office Action dated Oct. 17, 2006 in corresponding Japanese Patent Application No. 2004-242914.

* cited by examiner

*Primary Examiner*—Julie Anne Watko
(74) *Attorney, Agent, or Firm*—Staas & Halsey LLP

(57) ABSTRACT

A suspension assembly of an actuator for a disk drive to support a slider, on which a read/write head is mounted, elastically biased toward a surface of a disk. The suspension assembly includes: a load beam coupled to an end of a swing arm of the actuator; a flexure supporting the slider and having a fixed end fixed to a surface of the load beam facing the disk and a free end disposed close to a leading end of the load beam; an extender extending from the free end of the flexure; and a limiter limiting a range of up and down vibrations of the extender.

13 Claims, 6 Drawing Sheets

SUSPENSION ASSEMBLY OF ACTUATOR FOR DISK DRIVE WITH PORTION OF LOAD BEAM INCLINED LENGTHWISE BETWEEN LIMITER AND LEADING END

CROSS REFERENCE TO RELATED APPLICATION

This application claims the priority of Korean Patent Application No. 2003-58779, filed on Aug. 25, 2003, in the Korean Intellectual Property Office, the disclosure of which is incorporated herein in its entirety by reference.

BACKGROUND OF THE INVENTION

1. Field of the Invention

The present invention relates to a disk drive, and more particularly, to a suspension assembly of an actuator for a disk drive supporting a slider on which a rear/write head is mounted.

2. Description of Related Art

Hard disk drives (HDDs), which are data storage devices used for computers, use read/write heads to reproduce or record data with respect to a disk. In the HDD, the head performs its functions while being moved by an actuator to a desired position in a state of being lifted to a specified height from a recording surface of a rotating disk.

FIG. 1 is a plan view illustrating the configuration of a conventional hard disk drive. Referring to FIG. 1, the hard disk drive includes a spindle motor 12 installed on a base member 10, a disk 20 which is one or more disks and installed on the spindle motor 12, and an actuator 30 to move a read/write head (not shown) for reproducing and recording data to a specified position on the disk 20. The actuator 30 includes a swing arm 32 rotatably coupled to a pivot bearing 31 installed on the base member 10, a suspension assembly 40 installed at one end portion of the swing arm 32 and supporting a slider 44, on which the head is mounted, toward a surface of the disk 20 to be elastically biased, and a voice coil motor (VCM) to rotate the swing arm 32. The voice coil motor includes a VCM coil 36 coupled to the other end portion of the swing arm 32, a lower yoke 37 installed under the VCM coil 36, and a magnet 38 attached to an upper surface of the lower yoke 37. Although not shown in the drawing, the voice coil motor may further include an upper yoke installed above the VCM coil 36 and a magnet attached to a lower surface of the upper yoke.

The voice coil motor having the above configuration is controlled by a servo control system to rotate the swing arm 32 in a direction following the Fleming's left hand rule by the interaction between current applied to the VCM coil 36 and a magnetic field formed by the magnet 38. That is, when the power of the hard disk drive is turned on and the disk 20 starts to rotate in a direction D, the voice coil motor rotates the swing arm 32 counterclockwise, that is, in a direction A, to move the slider 44 on which the read/write head is mounted toward a position above the recording surface of the disk 20. The slider 44 is lifted to a specified height from the surface of the disk 20 by a lift force generated by the rotating disk 20. In this state, the head mounted on the slider 44 reproduces or records data with respect to the recording surface of the disk 20.

When the hard disk drive is not in operation, that is, the rotation of the disk 20 is stopped, the head is parked at a position out of the recording surface of the disk 20 so that the head does not collide against the recording surface of the disk 20. The head parking system can be classified into a contact start stop (CSS) method and a ramp loading method. In the CSS method, a parking zone where data is not recorded is provided at an inner circumferential side of the disk 20 and the head is parked in the parking zone in a contact manner. However, in a head parking system adopting the CSS method, since the parking zone needs to be provided at the inner circumferential side of the disk 20, a data storage is lessened. Thus, to meet the recent trend toward a higher data recording density, a head parking system adopting the ramp loading method which can secure a larger data storage space is wildly adopted.

In the ramp loading method, a ramp 50 is installed outside the disk 20 and the head is parked on the ramp 50. To this end, the suspension assembly 40 has an end-tab 45 supported by the ramp 50. When the power of the hard disk drive is turned off and the disk 20 stops rotating, the voice coil motor rotates the swing arm 32 clockwise, that is, in a direction B, and accordingly, the end-tab 45 is moved from the disk 20 to the ramp 50 to be supported by the ramp 50.

In a state in which the read/write head is parked on the ramp 50, when an external impact or vibrations are applied to the disk drive, the actuator 30 is rotated and moved toward the recording surface of the disk 20 from the ramp 50. In this case, the recording surface of the disk 20 may be damaged by the head which contacts the same. Thus, in a state in which the disk 20 stops rotating and the head is parked on the ramp 50, the actuator 30 needs to be locked at a specified position so as not to rotate. For this purpose, an actuator latch 60 is provided.

FIGS. 2 and 3 are a perspective view and a side view, respectively, illustrating the suspension assembly of an actuator shown in FIG. 1.

Referring to FIGS. 2 and 3, the suspension assembly 40 includes a load beam 41 coupled to an end portion of the swing arm 32, the end-tab 45 extending from an end portion of the load beam 41, and a flexure 43 supporting the slider 44 on which the head is mounted. The load beam 41 and the flexure 43 are typically formed of a thin stainless steel plate. The load beam 41 has a thickness of about 0.5 mm to have a certain rigidity while the flexure 43 has a thickness of about 0.2 mm, which is relatively thinner than the load beam 41, so that a free movement is possible as described later. A rear end portion of the flexure 43 is fixed by welding to a surface of the load beam 41, that is, a surface facing the disk 20 while a leading end portion thereof is freely moved up and down. A dimple 42 protruding toward the flexure 43 is formed on the load beam 41. The dimple 42 provides a specified elastic force to the flexure 43 so that the flexure 43 can freely move. Accordingly, smooth pitching and rolling of the slider 44 attached to the flexure 43 are possible.

A protrusion 46 protruding toward a support surface 51 is generally formed on the end-tab 45 to reduce a contact area between the end-tab 45 and the support surface 51 of the ramp 50.

However, in the conventional suspension assembly 40 having the above configuration, when an external impact is applied, the leading end portion of the flexure 43, that is, a free end, vibrates up and down. If the external impact is large enough to cause severe vibrations, the flexure 43 may be bent and deformed or the sliders 44 facing each other bump against each other so that the heads mounted on the sliders 44 may be damaged.

BRIEF SUMMARY

To solve the above and/or other problems, the present invention provides a suspension assembly of an actuator for a disk drive which can limit up/down vibrations of the flexure due to an external impact so that deformation of the flexure and damage to the head can be prevented.

According to an aspect of the present invention, there is provided a suspension assembly of an actuator for a disk drive to support a slider, on which a read/write head is mounted, elastically biased toward a surface of a disk. The suspension assembly includes a load beam coupled to an end of a swing arm of the actuator, a flexure supporting the slider and having a fixed end fixed to a surface of the load beam facing the disk and a free end disposed close to a leading end of the load beam, an extender extending from the free end of the flexure, and a limiter limiting a range of up and down vibrations of the extender due to an impact.

An end of the limiter may be connected to the load beam and another end may be separated from the load beam.

Both ends of the limiter may be connected to the load beam.

An inclination portion inclined in a lengthwise direction of the load beam may be formed between the limiter and the leading end portion of the load beam.

The limiter may have an arc-shaped section.

An end-tab to park the head on a ramp may be extended from a leading end of the load beam. The limiter may have an arc-shaped section and the shape of the section may extend toward the end-tab.

A buffering coating film may be formed at least on a surface of the extender contacting the limiter. The buffering coating film may be made of epoxy resin.

According to another aspect of the present invention, there is provided an actuator for a disk drive having a suspension assembly supporting a slider, on which a read/write head is mounted, elastically biased toward a surface of a disk. The actuator includes: a load beam coupled to an end of a swing arm of the actuator; a flexure supporting the slider and having a fixed end fixed to a surface of the load beam facing the disk and a free end disposed close to a leading end of the load beam; an extender extending from the free end of the flexure; and a limiter limiting a range of up and down vibrations of the extender.

According to still another aspect of the present invention, there is provided an actuator suspension assembly for a slider. The suspension assembly includes: a load beam at an end of a swing arm of the actuator; a flexure movably connected at an end to the load beam and having a free end, the flexure disposed on a disk-facing side of the load beam; an extender extending from the free end; and a limiter which limits vertical movement of the extender.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
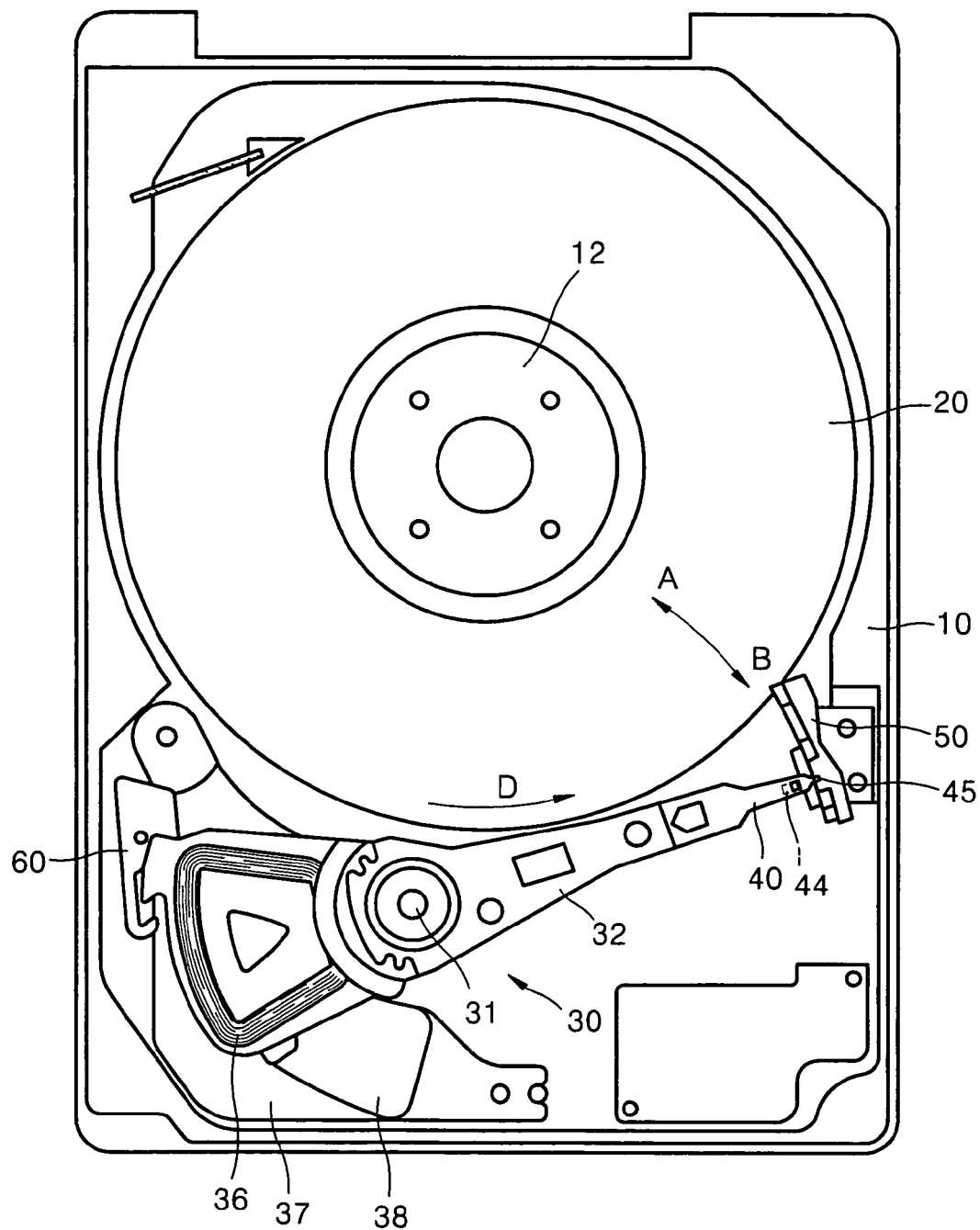
FIG. 1 is a plan view illustrating the configuration of a conventional hard disk drive.
Figure 2:
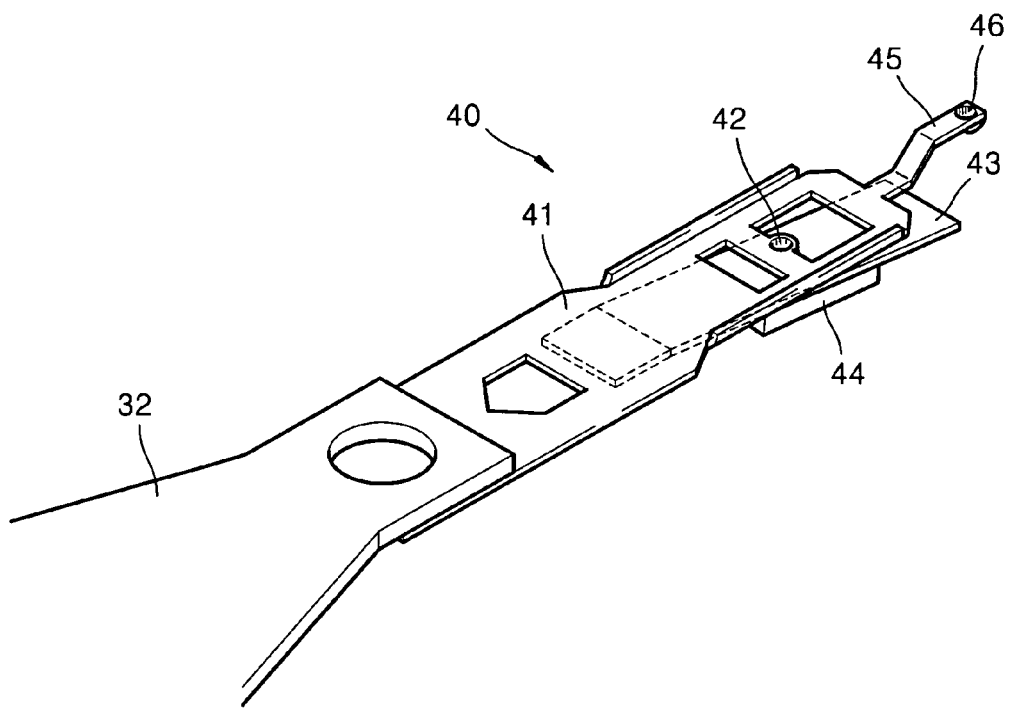
FIGS. 2 and 3 are a perspective view and a side view, respectively, illustrating the suspension assembly of an actuator shown in FIG. 1.
Figure 3:
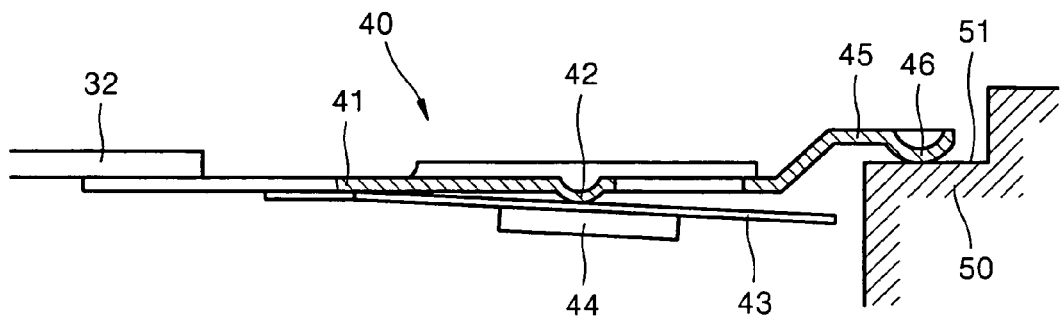

Reference will now be made in detail to embodiments of the present invention, examples of which are illustrated in the accompanying drawings, wherein like reference numerals refer to the like elements throughout. The embodiments are described below in order to explain the present invention by referring to the figures.

In the following descriptions, the same reference numerals indicate the same constituent elements.

Figure 4:
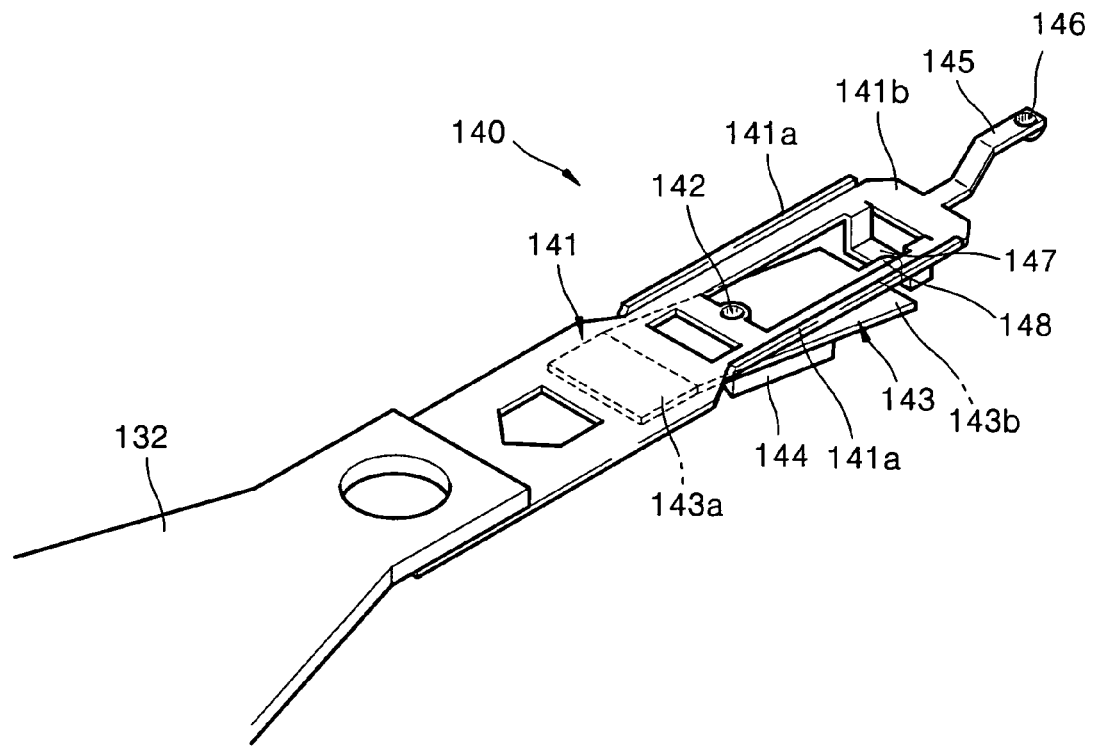
FIG. 4 is a perspective view illustrating a suspension assembly of an actuator for a disk drive according to a first embodiment of the present invention.
Figure 5:
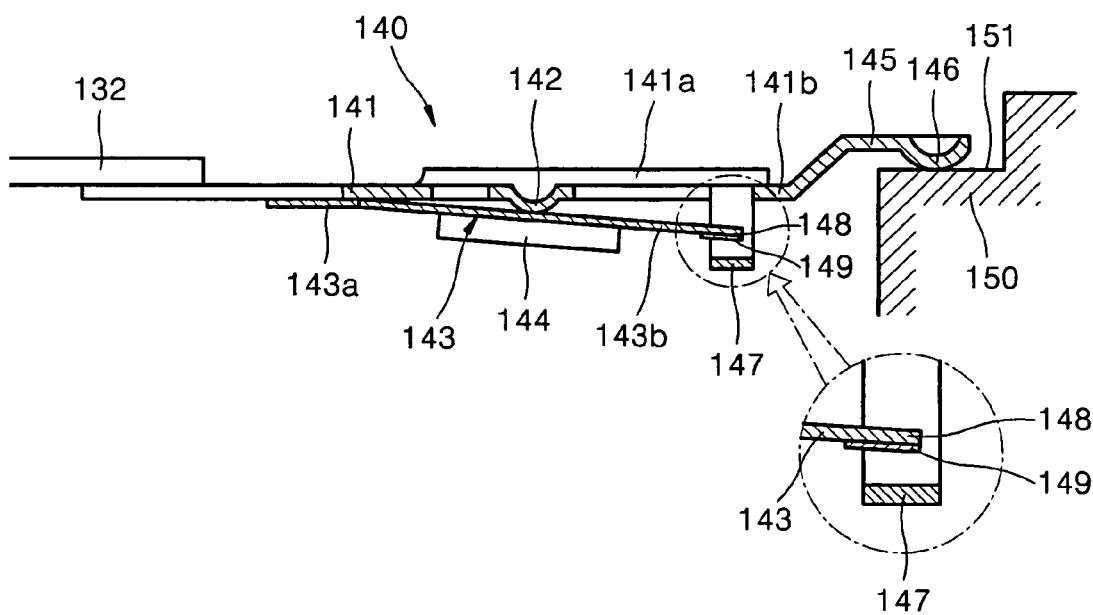
FIG. 5 is a vertical sectional view illustrating the suspension assembly of FIG. 4 in a lengthwise direction.

Referring to FIGS. 4 and 5, a suspension assembly 140 according to a first embodiment of the present invention is provided on an actuator to move a read/write head for reproducing and recording data to a specified position above a disk and support a slider 144, on which the head is mounted, to be elastically biased toward a surface of the disk.

The suspension assembly 140 according to the first embodiment of the present invention includes a load beam 141, a flexure 143, and an arrangement to limit a range of up/down vibrations of a free end 143b of the flexure 143. The arrangement includes an extender 148 provided on the flexure 143 and a limiter 147 provided on the load beam 141.

The load beam 141 is coupled to a swing arm 132 of the actuator rotatably installed on a base member of a disk drive. The load beam 141 is manufacturable by press-processing a thin metal plate, such as a stainless steel plate having a thickness of about 0.05 mm. To improve rigidity of the load beam 141, each of the sides of the load beam 141 is bent upward so as to a sidewall 141a is formed along both side edges of the load beam 141.

An end-tab 145 to park the read/write head on a ramp 150 is provided on the load beam 141. The end-tab 145 extends a specified length from the leading end of the load beam 141. A protrusion 146 protruding toward a support surface 151 of the ramp 150 is formed at an end of the end-tab 145 to reduce a contact area between the support surface 151 of the ramp 150 and the end-tab 145.

The flexure 143 supporting the slider 144 on which the head is mounted is attached to a surface of the load beam 143, that is, a surface facing the disk. One end, that is, a fixed end 143a, of the flexure 143 is fixed, by welding for example, to the surface of the load beam 143, which faces the disk. The other end, that is, a free end 143b is located near the leading end 141b of the load beam 141. The flexure 143 is manufacturable by a thin stainless steel plate like the load beam 141. However, the flexure 143 is thinner than the load beam 141, to have a thickness of about 0.02 mm, for example, so that free rolling and pitching of the slider 144 attached to the flexure 143 are possible.

A dimple 142 is formed on the rod beam 141 to protrude toward the flexure 143. The dimple 142 provides a specified elastic force to the flexure 143. Such structure enables a free movement of the flexure 143. Accordingly, pitching and rolling of the slider 144 attached to the flexure 143 is smoothly performed.

An extender 148 and a limiter 147 to limit a range of up/down vibrations of the free end 143b of the flexure 143 are provided on the suspension assembly 140 according to the first embodiment of the present invention.

The extender 148 extends to a specified length from the free end 143b of the flexure 143. A coating film 149 formed of a material exhibiting a buffering feature, for example, epoxy resin, is formed on a lower surface of the extender 148, that is, a surface thereof contacting the limiter 147 when the extender 148 vibrates up and down.

The limiter 147 is formed by being bent from the load beam 141 toward the extender 148 and has a function to limit a range in which the extender 148 moving up and down due to an external impact. The limiter 147 is formed close to the leading end 141b of the load beam 141. The limiter 147 is formable by marking a cutting line on a part of the load beam 141 and bending downward a portion separated from the leading end 141b of the load beam 141 by the cutting line. The depth of the limiter 147 is formed to be greater than the interval between the extender 148 and the load beam 141. A specified gap is formed between the limiter 147 and the extender 148 and the size of the gap is determined within a range between the minimum limit to secure smooth rolling and pitching of the slider 144 and the maximum limit to prevent deformation of the flexure 143 and collision of the sliders 144.

Figure 6A:
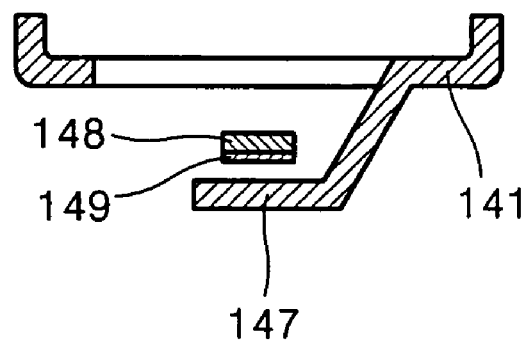
FIG. 6A is a vertical sectional view illustrating a leading end portion of the suspension assembly of FIG. 4 in a widthwise direction.

As shown in FIG. 6A, the limiter 147 has one end connected to the load beam 141 and the other end separated from the load beam 141. In the limiter 147 having the above shape, only one end thereof is supported by the load beam 141. When the limiter 147 is formed by bending part of the load beam 141, since the limiter 147 has the same thickness as that of the load beam 141, deformation of the limiter 147 can be prevented.

Figure 6B:
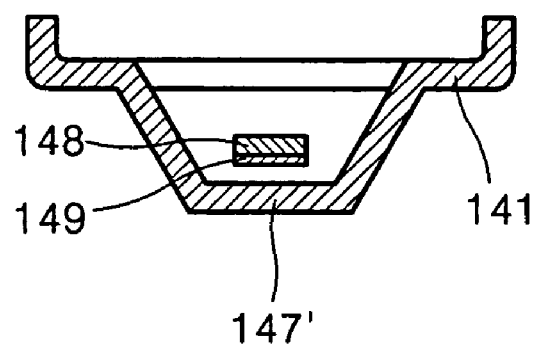
FIG. 6B is a view illustrating a modified limiter of FIG. 6A.

As shown in FIG. 6B, a limiter 147' may be formed such that both ends thereof are connected to the load beam 141. When the limiter 147' is formed by bending part of the load beam 141, it is contemplated that the limiter 147' can be thinner than the load beam 141. However, since both ends of the limiter 147' are supported by the load beam 141, deformation of the limiter 147' is prevented.

In the suspension assembly 140 having the above configuration according to this embodiment, when an external impact is applied, the free end 143b of the flexure 143 and the extender 148 vibrate together up and down. The upward movement of the extender 148 is restricted by the load beam 141 while the downward movement thereof is restricted by the limiter 147. Thus, when a relatively large amount of an external impact is applied, since the up/down vibration range of the extender 148 is limited within a space between the limiter 147 and the load beam 141, the problem of the flexure 143 being bent and deformed or the sliders 144, facing each other, colliding against each other so that the head mounted on the slider 144 is damaged, is solved. The buffering coating film 149 formed on the surface of the extender 148 absorbs an impact when the extender 148 and the limiter 147 collide with each other. Accordingly, deformation of the extender 148 and the limiter 147 is prevented. Also, the suspension assembly 140 having the above configuration according to the present embodiment is simply manufactured by modifying the existing configuration.

Figure 7:
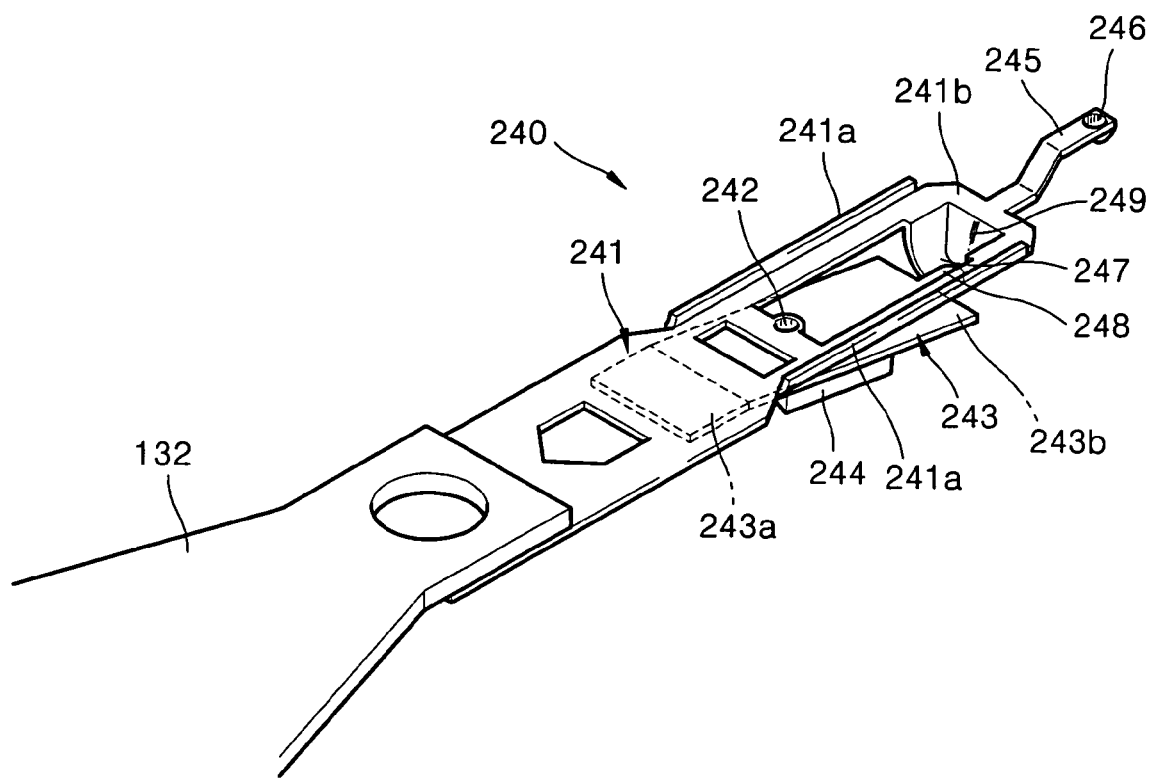
FIG. 7 is a perspective view illustrating a suspension assembly of an actuator for a disk drive according to a second embodiment of the present invention.
Figure 8:
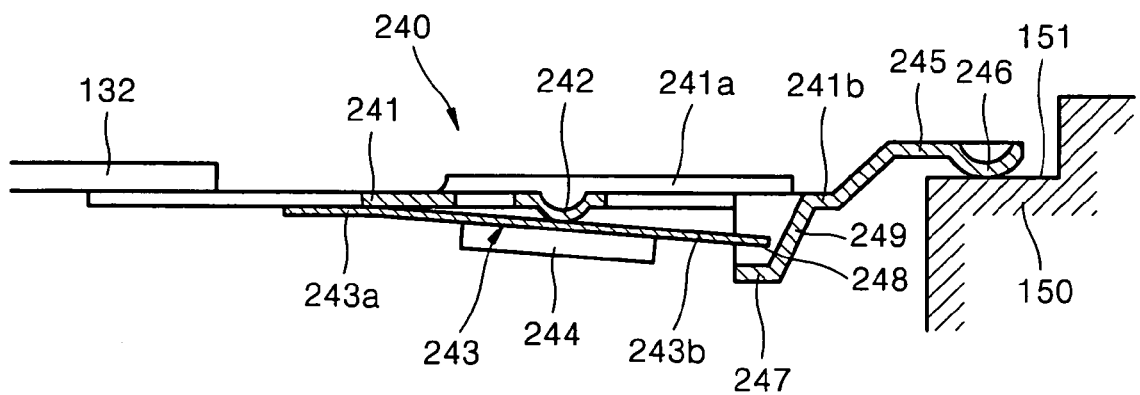
FIG. 8 is a vertical sectional view illustrating the suspension assembly of FIG. 7 in a lengthwise direction.

FIG. 7 is a perspective view illustrating a suspension assembly of an actuator for a disk drive according to a second embodiment of the present invention. FIG. 8 is a vertical sectional view illustrating the suspension assembly of FIG. 7 in a lengthwise direction.

Referring to FIGS. 7 and 8, much of the basic configuration of a suspension assembly 240 according to a second embodiment of the present invention is the same as that of the first embodiment. That is, the suspension assembly 240 includes a load beam 241 coupled to an end of the swing arm 132 of the actuator, a flexure 243 supporting a slider 244 on which the head is mounted and having a fixed end 243a fixed to a surface of the load beam 241 facing the disk and a free end 243b disposed close to a leading end 241b of the load beam 241, and an arrangement limiting a range of up/down vibrations of the free end 243b of the flexure 243. The arrangement includes an extender 248 extending from the free end 243b of the flexure 243 and a limiter 247 formed by being bent toward the extender 248 from the load beam 241. A side wall 241a is formed along both side edges of the suspension assembly 240. A dimple 242 protruding toward the flexure 243 is formed on the load beam 241. An end-tab 245 for head parking extends from the leading end 241b of the load beam 241. The end-tab 245 has a protrusion 246 that is bulged toward the support surface 151 of the ramp 150. Since the operations and effects of the above constituent elements are the same as those of the first embodiment, further descriptions thereof are omitted.

In the second embodiment of the present invention, it is a characteristic feature that an inclination 249 inclined in a lengthwise direction of the load beam 241 is formed between the limiter 247 and the leading end 241b of the load beam 241. The limiter 247 may have an arc-shaped section. According to the above configuration, since the limiter 247 and the leading end 241b of the load beam 241 are connected by the inclination 249, the deformation of the limiter 247 is preventable. Also, the rigidity of the leading end 241b of the load beam 241 increases so that the end-tab 245 is firmly supported.

Although not shown, a buffering coating film is formed on a surface of the extender 248 contacting the limiter 247, as in the first embodiment.

Figure 9:
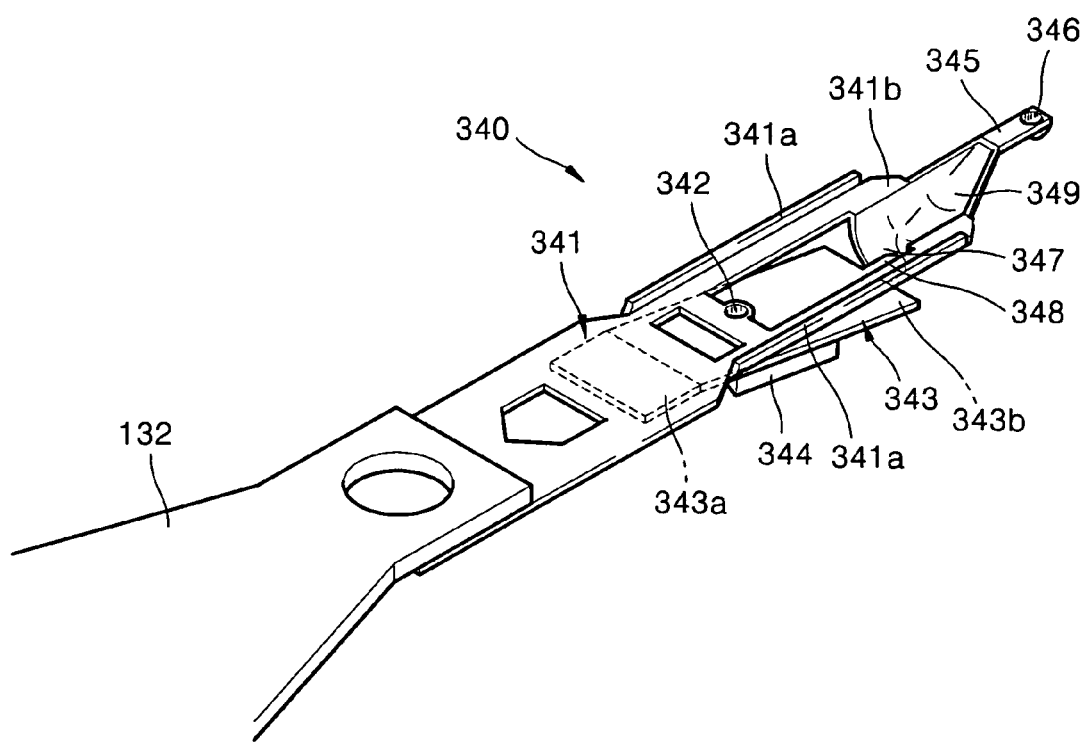
FIG. 9 is a view illustrating a suspension assembly of an actuator for a disk drive according to a third embodiment of the present invention.
Figure 10:
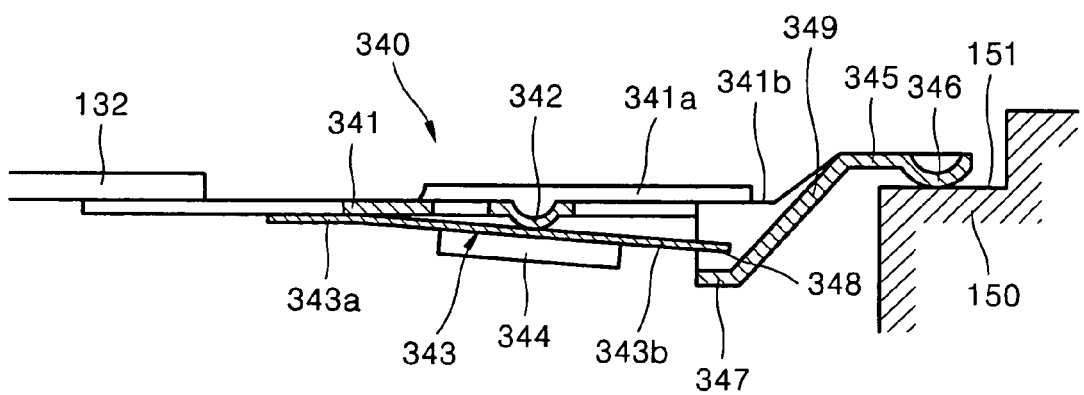
FIG. 10 is a vertical sectional view illustrating the suspension assembly of FIG. 9 in a lengthwise direction.

FIG. 9 is a view illustrating a suspension assembly of an actuator for a disk drive according to a third embodiment of the present invention. FIG. 10 is a vertical sectional view illustrating the suspension assembly of FIG. 9 in a lengthwise direction.

Referring to FIGS. 9 and 10, the basic configuration of the suspension assembly 340 according to a third embodiment of the present invention is the same as that of the first embodiment. That is, the suspension assembly 340 includes a load beam 341 coupled to an end of the swing arm 132 of the actuator, a flexure 343 having a fixed end 343a and a free end 343b and supporting the slider 344, and an extender 348 provided on the flexure 243 and a limiter 347 provided on the load beam 341 as a means limiting a range of up and down vibrations of the free end 343b of the flexure 243. A sidewall 341a and a dimple 342 are formed on the load beam 341. An end-tab 345 for head parking having the protrusion 346 that is bulged toward the support surface 151 of the ramp 150 extends from a leading end 341b of the load beam 341. Although not shown, a buffering coating film may be formed on a surface of the extender 348 contacting the limiter 347, as in the first embodiment. Since the operations and effects of the above constituent elements are the same as those of the first embodiment, detailed descriptions thereof will be omitted.

In the third embodiment of the present invention, a characteristic feature of the limiter 347 is an arc-shaped section and the shape of the section is extended to the end-tab 345. In other words, a concave groove 349 is formed in the upper portion of the limiter 347 and the concave groove 349 is extended to about a middle of the end-tab 345 via the leading end 341b of the load beam 341. Accordingly, the end-tab 345 has a canoe shape having a width narrowing from the leading end 341b of the load beam 341 to the protrusion 346. Since the end-tab 345 having the above shape has a large rigidity, the suspension assembly 340 can be stably supported in a state of being parked on the support surface 151 of the ramp 150.

As described above, in the suspension assembly according to the disclosed embodiments of the present invention, since the up and down vibrations of the flexure due to an external impact is limited within a specified range by the extender formed on the free end of the flexure and the limiter provided on the load beam, the deformation of the flexure and the damage of the head due to excessive vibrations are prevented. Thus, reliability in the operation of the disk drive is improved.

Also, since the arc-shaped section of the limier extends toward the end-tab for head parking and the end-tab has a canoe shape, the rigidity thereof increases.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A suspension assembly of an actuator for a disk drive to support a slider, on which a read/write head is mounted, elastically biased toward a surface of a disk, comprising:
    a load beam coupled to an end of a swing arm of the actuator;
    a flexure supporting the slider and having a fixed end fixed to a surface of the load beam facing the disk and a free end disposed close to a leading end of the load beam;
    an extender extending from the free end of the flexure; and
    a limiter limiting a range of up and down vibrations of the extender,
    wherein the load beam includes an inclination portion inclined in a lengthwise direction of the load beam between the limiter and the leading end of the load beam.

2. The suspension assembly of claim 1, wherein the limiter is integral with the load beam.

3. The suspension assembly of claim 1, wherein an end of the limiter is connected to the load beam and another end thereof is separated from the load beam.

4. The suspension of claim 1, wherein the limiter is formed of a bent portion of the load beam.

5. The suspension assembly of claim 1, wherein the limiter has an arc-shaped section.

6. The suspension assembly of claim 1, further comprising an end-tab extending from a leading end of the load beam to park the read/write head on a ramp.

7. The suspension assembly of claim 6, wherein the limiter has an arc-shaped section and the shape of the section extends toward the end-tab.

8. The suspension assembly of claim 6, wherein a concave groove is formed in an upper portion of the limiter and extends to about a middle of the end-tab.

9. The suspension assembly of claim 1, wherein a buffering coating film is formed at least on a surface of the extender contacting the limiter.

10. The suspension assembly of claim 9, wherein the buffering coating film is made of epoxy resin.

11. The suspension assembly of claim 1, wherein a depth of the limiter is greater than the greatest displacement of the free end of the extender from the load beam.

12. The suspension assembly of claim 1, wherein a gap is formed between the limiter and the extender within a range between a minimum to allows smooth rolling and pitching of the slider and a maximum to prevent deformation of the flexure.

13. The suspension assembly of claim 1, wherein the inclination portion connects the limiter to the leading edge of the load beam.

* * * * *

UNITED STATES PATENT AND TRADEMARK OFFICE
CERTIFICATE OF CORRECTION

PATENT NO. : 7,369,366 B2
APPLICATION NO. : 10/910349
DATED : May 6, 2008
INVENTOR(S) : Do-wan Kim et al.

It is certified that error appears in the above-identified patent and that said Letters Patent is hereby corrected as shown below:

Column 8, Line 14, after "suspension" insert --assembly--.

Signed and Sealed this

Seventh Day of October, 2008

JON W. DUDAS
*Director of the United States Patent and Trademark Office*